April 9, 1935.    C. B. SPASE    1,997,021
VIBRATION DAMPENER MOTION TRANSMITTING ELEMENT
Filed Dec. 16, 1932    2 Sheets-Sheet 1
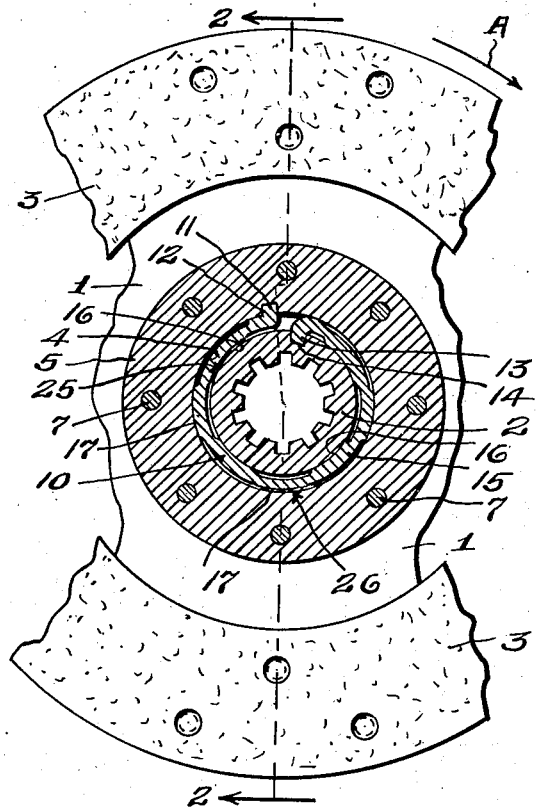
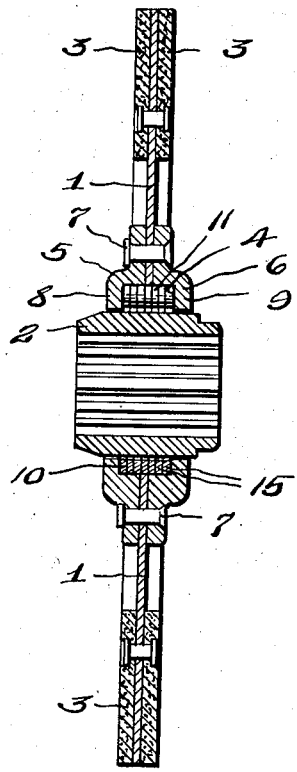
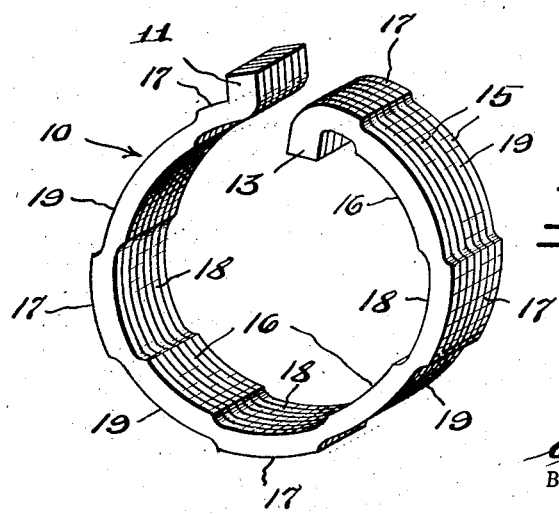
INVENTOR.
Charles B. Spase
BY
Bodell & Thompson
ATTORNEYS.

April 9, 1935.   C. B. SPASE   1,997,021
VIBRATION DAMPENER MOTION TRANSMITTING ELEMENT
Filed Dec. 16, 1932   2 Sheets-Sheet 2
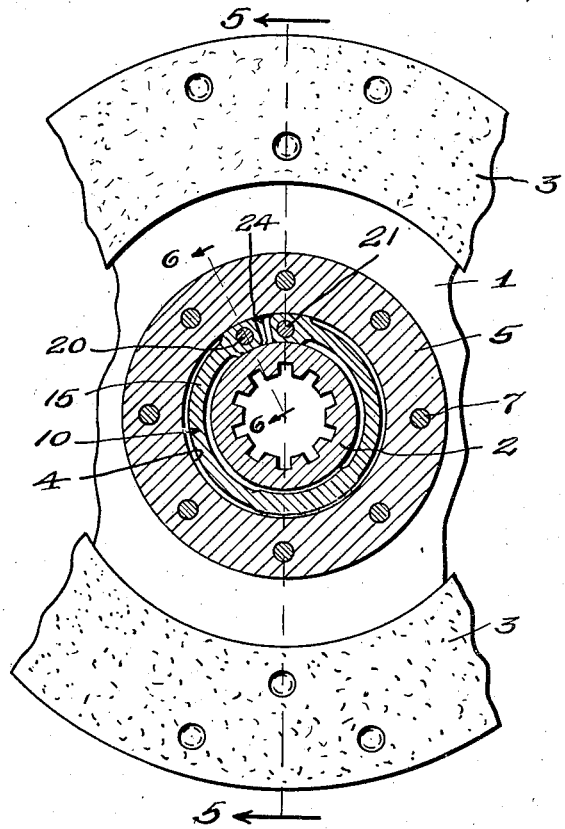
Fig-4-
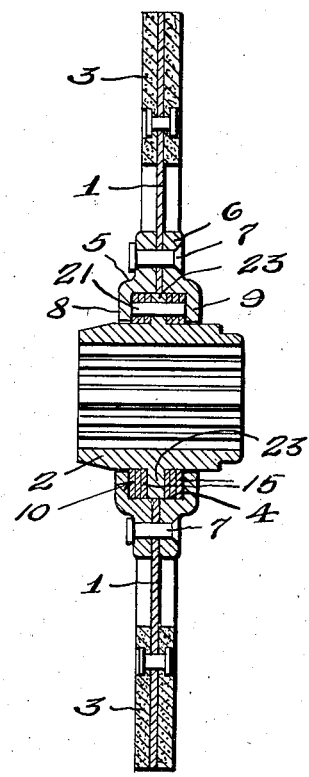
Fig-5-
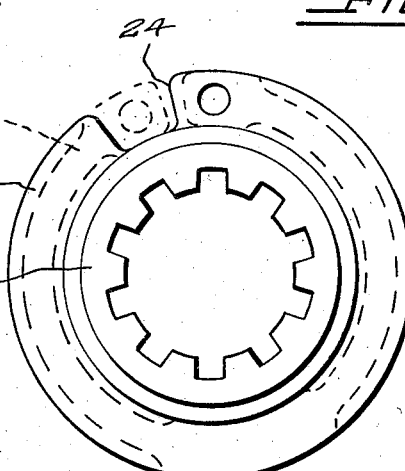
Fig-6-
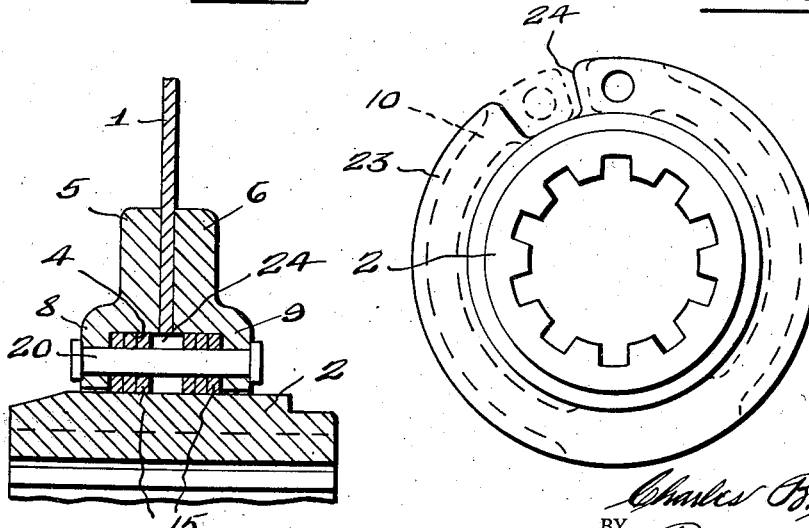
Fig-7-
INVENTOR.
Charles B. Spase
BY Bodell + Thompson
ATTORNEYS.

Patented Apr. 9, 1935

1,997,021

UNITED STATES PATENT OFFICE 1,997,021

VIBRATION DAMPENER MOTION TRANSMITTING ELEMENT

Charles B. Spase, Nedrow, N. Y., assignor to W. C. Lipe, Inc., Syracuse, N. Y., a corporation of New York Application December 16, 1932, Serial No. 647,656

7 Claims. (Cl. 64—100)

This invention relates to motion transmitting elements, as for instance, the disk or plate of friction clutches, such as are used in motor vehicles, and has for its object a particularly simple, economical, and compact, two-way vibration dampener clutch means built in the motion transmitting or clutch element.

It further has for its object, a vibration dampening means which consists of a plurality of duplicate parts which make up in effect an expansible and contractile band, and further a dampening means in which parts are in the form of split, flat rings, or washerlike members arranged side by side, and forming a band made up of laminations arranged edgewise to the axis of the clutch, and further a vibration dampening means which can be varied to suit the conditions under which the clutch is to work, or the engine to which the clutch is applied by merely adding, or subtracting, one or more laminations, or washers.

The invention consists in the novel features and in the combinations and constructions hereinafter set forth and claimed.

In describing this invention, reference is had to the accompanying drawings in which like characters designate corresponding parts in all the views.

Figure 1 is a fragmentary elevation, partly in section, of a clutch member, or plate, embodying my invention.

Figure 2 is a sectional view on line 2—2, Figure 1.

Figure 3 is an isometric view of the laminated expansible and contractile band.

Figures 4 and 5 are views, similar to Figures 1 and 2, of slightly modified forms of the vibration dampener band, Figure 5 being taken on line 5—5, Figure 4.

Figure 6 is a sectional view on line 6—6, Figure 4.

Figure 7 is an elevation of the hub shown in Figure 6.

I have here illustrated my invention as embodied in the so-called single plate type of friction clutch. This plate, as here shown, includes a driving member 1, a driven member 2, and friction snubbing or dampening means between said members. The driving member is provided with friction rings 3 on opposite sides of its outer margin for coacting with other parts of the clutch in a motor vehicle, as the recess in the fly wheel of the engine, and the pressure ring operated by the clutch spring and the throw-out mechanism, not shown. The member 1 is provided with a hub formed with an internal annular recess 4, the hub consisting of rings 5, 6, clamped on opposite sides of the inner margin of the disk 1, as by rivets 7, these rings 5, 6, having annular flanges 8, 9, forming the opposite walls of the recess 4. The inner member 2 is a sleeve, or hub, splined on the driven shaft of the clutch, not shown, the member 2 extending into, and as here shown, entirely through the driving member 1 on opposite sides thereof.

10 designates an expansible and contractile band encircling the sleeve 2 and located in the recess 4, the band being split, or divided, and anchored at its opposite ends respectively to the sleeve 2, and the hub of the disk 1, there being sufficient clearances between the sleeve 2 and the band 10 to permit the band to have a contracting action with varying force, and between the periphery of the band and the circumferential wall of the recess 4 to permit the band to have an expanding action with varying force.

As shown in Figures 1 and 3, the band is provided with an outwardly extending lug 11 at its ends which hooks into a suitable groove 12 in the hub of the disk 1, and with an inwardly extending lug 13 which hooks into a groove 14 in the periphery of the sleeve 2. The lug 13 holds the disk 1 from axial displacement. As thus far described, the structure is the same as that shown in my pending application 594,881, filed February 24, 1932, of which this application is a continuation in part.

Preferably, the band 10 is made up of a plurality of washerlike sections, or laminations 15 arranged side by side and edgewise relatively to the periphery of the hub 2 and the circumferential walls of the recess 4. These laminations are duplicates of each other and for a given size clutch. The clutch can be adjusted to the engine, or the conditions under which it is used, by adding, or subtracting, laminations. From an operation standpoint, the snubbing or dampening action of the laminated band is more sensitive and quicker and better adapted for snubbing torque vibrations than coiled or sinuous springs and also the number of laminations can be increased and diminished to adjust the snubbing or dampening means consisting of the laminations to a particular installation or to a particular type of engine. From a manufacturing standpoint, the laminated snubbing or vibration dampening means or spring can be made very economically and quickly assembled in the clutch, and the required number used without making a spring of special length or width for each different location and installation. As seen in Figure 3, the band 10, or laminations are provided with spaced apart integral projections, or shoes 16 and 17 on their inner and outer faces for engaging respectively the circumferential wall of the recess 4 and the periphery of the hub or sleeve 2, and with clearances or spaces 18 and 19 between said shoes, the shoes 16 being staggered with the shoes 17, that is, alternating with the shoes 17. By reason of these integral projections or spaced apart shoes 16 and 17, the band is provided with clearances located between the projections which give the band increased resiliency to work in a narrow widthwise space or annular recess and to distribute the resiliency throughout the length of the band and also provide ample braking or snubbing surfaces.

As seen in Figures 4, 5, 6, and 7, instead of forming the band, or the laminations, with the lugs as 11 and 13, the laminations may be secured to the disk 1, or the hub thereof by a laterally extending lug, shoulder, or pin, 20 passing transversely through like ends of the laminations and the flanges 8, 9, of the hub, and may be secured to the sleeve 2 by a similar pin 21 extending transversely through the other ends of the laminations, and through an annular flange 23 on the hub 2 in the recess 4. The pin 20 also extends through a slot, or notch 24 in the flange, this slot being long enough to permit play of the pin 20 therein sufficient to permit the band 10 to expand and contract.

In operation, the driving force applied to the member 1 in the direction of the arrow A, Figure 1, first is transferred to the band 10, or the laminations thereof, through the lug 11, or the pin 20, thus applying torque to the laminated clutch band 10 tending to contract it on the sleeve member 2 and hence, take up clearances at 25 between the shoes 16 and the periphery of the sleeve 2 and clutch the disk 1 to the sleeve member 2. The amount of contraction is in proportion to the driving force applied and hence, shocks or vibrations due to starting, or sudden acceleration of the member 1, and to the firing or explosions in the engine cylinders, are absorbed, or dampened, by the band 10, while contracting. When a back driving force is applied in a direction opposite to the arrow A, as when the vehicle is traveling or coasting faster than the engine connected to the disk 1 is driving, torque is applied to the member or band 10 in the opposite direction first tending to expand the laminated band 10 out of engagement with the sleeve member 2 and then taking up the clearances at 26 between the shoes 17 and the wall of the recess 4 and clutching the laminated band 10 to the circumferential wall of the recess 4, so that the shock, or vibration, caused by the acceleration of the member 2 relatively to the member 1, is not transmitted to the member 1, due to the fact that the laminated band 10 is momentarily released from transmitting force, while expanding.

After releasing, if greater back drive continues, the motion is transmitted to the member 1 through the frictional engagement of the laminations of the band 10 with the cylindrical wall of the recess 4. Thus, sudden acceleration of either the member 1, or the member 2, due to a greater back driving force, is dampened, or absorbed, or cut out, before the members 1 and 2 are bound together by the contracting, or expanding, action of the laminations of the band 10.

Owing to the laminated structure of the clutch band 10, it is made up of a number of washerlike parts, or elements, and the required number of parts can be selected for any installation to suit conditions. Also, the washerlike construction makes the vibration dampener particularly economical in construction and especially easy to install and adjust.

What I claim is:

1. A motion transmitting member including a disk having a hub formed with an internal annular recess having a circumferential wall, an inner member extending into the hub, and expansible and contractile means including a plurality of separate elements arranged side by side in said recess, said elements encircling the inner member and being anchored at their ends respectively to said hub and to the inner member, said elements forming a resilient laminated expansible and contractile metal band arranged with the laminations edgewise relative to the periphery of the inner member and the circumferential wall of said recess.

2. A motion transmitting member including a disk having a hub formed with an internal annular recess having a circumferential wall, an inner member extending into the hub and expansible and contractile clutch means between said members including a resilient expansible and contractile laminated metal band located in the recess and encircling the inner member, and being anchored at its ends to said members respectively, said band operating to contract on the inner member and expand against said wall.

3. A motion transmitting member including a disk having a hub formed with an internal annular recess having a circumferential wall and an inner member extending into the hub, and a plurality of resilient split washerlike metal elements located in the recess and arranged side by side therein, and edgewise relatively to the inner member and the circumferential wall of the recess, each of said elements being anchored at its opposite ends respectively to the hub and to the inner member, said elements forming a resilient expansible and contractile metal laminated band.

4. A motion transmitting member including a disk having a hub member, an inner member extending into the hub member, said members being formed to provide an internal annular recess between them having a circumferential wall on the outer member and an inner wall on the periphery of the inner member, and expansible and contractile snubbing means between said members including an expansible and contractile band located in the recess and encircling the inner member, and being anchored at its ends to said members respectively, said band operating to contract on the inner member and expand against said wall, said band having spaced apart projections forming shoes on its inner and outer faces for engaging respectively the periphery of the inner member and the annular wall of the recess, the projections providing narrower portions between them for increasing and distributing the resiliency of the band.

5. A motion transmitting member including a disk having a hub member, an inner member extending into the hub member, said members being formed with an internal annular recess between them having a circumferential wall on the outer member and an inner wall on the periphery of the inner member, and expansible and contractile snubbing means between said members including an expansible and contractile band located in the recess and encircling the inner member, and being anchored at its ends to said members respectively, said band operating to contract on the inner member and expand against said wall, said band having spaced apart projections forming shoes on its inner and outer faces for engaging respectively the periphery of the inner member and the annular wall of the recess, the shoes on one side of said band alternating with the shoes on the other side, said projections providing narrower portions between them for distributing the resiliency of the band.

6. A motion transmitting member including a disk having a hub formed with an internal annular recess having a circumferential wall and an inner member extending into the hub, and a plurality of split washerlike elements located in the recess and arranged side by side therein, and edgewise relatively to the inner member and the circumferential wall of the recess, each of said elements being anchored at its opposite ends respectively to the hub and to the inner member, said elements forming an expansible and contractile laminated band, said elements having spaced apart projections on their inner and outer faces forming shoes for engaging respectively the periphery of the inner member and the circumferential wall of the recess.

7. A motion transmitting member including a disk having a hub formed with an internal annular recess having a circumferential wall and an inner member extending into the hub, and a plurality of split washerlike elements located in the recess and arranged side by side therein, and edgewise relatively to the inner member and the circumferential wall of the recess, each of said elements being anchored at its opposite ends respectively to the hub and to the inner member, said elements forming an expansible and contractile laminated band, said elements having spaced apart projections on their inner and outer faces forming shoes for engaging respectively the periphery of the inner member and the circumferential wall of the recess, the shoes on one side alternating with those on the other.

CHARLES B. SPASE.